United States Patent [19]

Mooney et al.

[11] Patent Number: 5,515,440
[45] Date of Patent: *May 7, 1996

[54] PREBOOT PROTECTION OF UNAUTHORIZED USE OF PROGRAMS AND DATA WITH A CARD READER INTERFACE

[75] Inventors: David M. Mooney, Eden Prairie; James B. Glazier, Hopkins; David E. Wood, Shorewood; Joseph A. Kimlinger, Willernie, all of Minn.

[73] Assignee: Integrated Technologies of America, Inc., Hopkins, Minn.

[*] Notice: The term of this patent subsequent to June 4, 2012 has been disclaimed.

[21] Appl. No.: 199,678

[22] Filed: Apr. 21, 1994

Related U.S. Application Data

[63] Continuation of Ser. No. 893,670, Jun. 4, 1992, Pat. No. 5,327,497.
[51] Int. Cl.$^6$ .................. H04K 1/00; H04K 9/00
[52] U.S. Cl. .................. 380/25; 340/825.34; 327/525
[58] Field of Search .................. 307/202.1; 380/23, 380/25; 340/825.34

[56] References Cited

U.S. PATENT DOCUMENTS

| | | |
|---|---|---|
| 4,742,215 | 5/1988 | Daughters et al. . |
| 4,797,928 | 1/1989 | Dykes .................. 380/49 |
| 4,817,140 | 3/1989 | Chandra .................. 380/4 |
| 5,065,429 | 11/1991 | Lang . |

(List continued on next page.)

FOREIGN PATENT DOCUMENTS

| | | |
|---|---|---|
| 0170716 | 2/1986 | European Pat. Off. . |
| 0182244 | 5/1986 | European Pat. Off. . |
| 0190733 | 8/1986 | European Pat. Off. . |

(List continued on next page.)

OTHER PUBLICATIONS

BITS: A Smartcard Protected Operating System, *Communications of the ACM*, Nov. 1994, vol. 37, No. 11, pp. 66–94.

(List continued on next page.)

*Primary Examiner*—Stephen C. Buczinski
*Attorney, Agent, or Firm*—Schwegman, Lundberg & Woessner

[57] ABSTRACT

A secure computer controlling access to internal devices via an integrated card reader. A microprocessor-controlled card reader interface logically connected to the CPU of the computer reads and writes information from and to a card placed in the card reader and performs additional functions in response to commands received from the CPU. The boot ROM of the computer is programmed to start execution from a program logic device which runs a verification program to verify the authenticity of a user. Upon a valid user card being placed in the card reader, one or more questions are read from the card and displayed to the user. The user's responses are saved and compared to the correct answers stored on the card, and if the responses match the correct answers, a power control circuit is used by the CPU to turn on power to computer peripherals the user has been authorized to use.

The system additionally provides for a method of initializing and authorizing a user card with a security administrator card. Upon a valid security administrator card being placed in the card reader, a security administrator initializes and authorizes one or more individual user cards by selecting from a list of menu options displayed to the security administrator. The security administrator inputs a list of questions and answers which are then stored on the user card for use during the verification procedure.

The system further provides for the physical and logical destruction of data in response to unauthorized attempts by a user to violate the physical or logical integrity of the computer system. The physical and logical destruction of data may be disabled for maintenance or configuration purposes by the use of a maintenance card.

9 Claims, 8 Drawing Sheets

U.S. PATENT DOCUMENTS

| | | | |
|---|---|---|---|
| 5,084,085 | 9/1991 | Abraham et al. | 380/23 |
| 5,091,939 | 2/1992 | Cole et al. | 380/23 |
| 5,159,629 | 10/1992 | Double et al. | 380/23 |
| 5,210,795 | 5/1993 | Lipner et al. | 380/23 |
| 5,933,898 | 6/1990 | Gilberg et al. | 307/202.1 |

FOREIGN PATENT DOCUMENTS

| | | |
|---|---|---|
| 0216375 | 4/1987 | European Pat. Off. . |
| 0262025 | 3/1988 | European Pat. Off. . |
| 0458614 | 5/1990 | European Pat. Off. . |
| 2584514 | 1/1987 | France . |
| 2112190 | 7/1993 | United Kingdom . |

OTHER PUBLICATIONS

OTHER PUBLICATIONS

SmartDisk Security Corporation, *SafeBoot*™ *PC Security Sytem* product brochure, 2 pages, 1993.

OTHER PUBLICATIONS

Super Crypt Spec from CE INFO SYS, *High Speed Cryptographic Data Security Device*, pp. 1–35.

OTHER PUBLICATIONS

INFOSYS–CryptCard, *Security System for Notebooks*, pp. 1–14.

PREBOOT PROTECTION OF UNAUTHORIZED USE OF PROGRAMS AND DATA WITH A CARD READER INTERFACE

This is a continuation of application Ser. No. 07/893,670, filed Jun. 4, 1992, now U.S. Pat. No. 5,327,497.

FIELD OF THE INVENTION

The present invention pertains generally to integrated circuit (IC) information card systems, and more particularly to a microprocessor-controlled card reader interface for controlling user access to the components of a secure computer.

BACKGROUND OF THE INVENTION

The power and flexibility of personal computers has seen a tremendous growth in their use in all areas of our society, including applications where the data is sensitive in nature. Traditionally, these applications have been found within agencies of the federal government, but the highly competitive marketplace has made such information as marketing, financial, and business plans equally as sensitive to companies who compete against each other in the commercial sector as well.

In the early years of the industry when computers were large mainframes, it was relatively easy to control access to them simply by controlling physical access to the room they were contained in. Since modern personal computers are much smaller and may in fact be designed to be carried with a user, it is much more difficult to prevent unauthorized access while still maintaining the advantage of portability.

While it is possible through a software program running on the computer to require a user to enter a password or other verification code, this method is not robust in that a password may be guessed, or the software program may be bypassed by commercially available software development tools. Other security methods involving various hardware devices or keys have been proposed and implemented, but they too suffer from the disadvantage that a sufficiently knowledgeable and persistent user may gain unauthorized access to data by tapping into the computer's operating system with specially designed software programs. For applications with particularly sensitive data, it may also be desirable to provide a way to physically and logically destroy the data before it becomes compromised.

Therefore, there is a need to have a convenient way to prevent the unauthorized use of a computer system which is not subject to bypass while still maintaining the portability and flexibility of the computer system. There is an additional need to provide a way to authorize users to use the computer system. There is a further need to physically and logically destroy data in response to unauthorized attempts by a user to violate the physical or logical integrity of the computer system.

SUMMARY OF THE INVENTION

The present invention provides for a secure computer controlling access to internal devices via an integrated card reader. A microprocessor-controlled card reader interface logically connected to the CPU of the computer reads and writes information from and to a card placed in the card reader and performs additional functions in response to commands received from the CPU. The boot ROM of the computer is programmed to start execution from a program logic device which runs a verification program to verify the authenticity of a user. Upon a valid user card being placed in the card reader, one or more questions are read from the card and displayed to the user. The user's responses are saved and compared to the correct answers stored on the card, and if the responses match the correct answers, a power control circuit is used by the CPU to turn on power to computer peripherals the user has been authorized to use.

According to an additional aspect of this invention, the system provides for a method of initializing and authorizing a user card with a security administrator card. Upon a valid security administrator card being placed in the card reader, a security administrator initializes and authorizes one or more individual user cards by selecting from a list of menu options displayed to the security administrator. The security administrator inputs a list of questions and answers which are then stored on the user card for use during the verification procedure.

According to a further aspect of this invention, the system provides for the physical and logical destruction of data in response to unauthorized attempts by a user to violate the physical or logical integrity of the computer system. The physical and logical destruction of data may be disabled for maintenance or configuration purposes by the use of a maintenance card.

The preceding and other features and advantages of the invention will become further apparent from the detailed description that follows. This description is accompanied by a set of drawing figures. Numerals are employed throughout the written description and the drawings to point out the various features of this invention, like numerals referring to like features throughout.

DETAILED DESCRIPTION OF THE PREFERRED EMBODIMENTS

Figure 1:
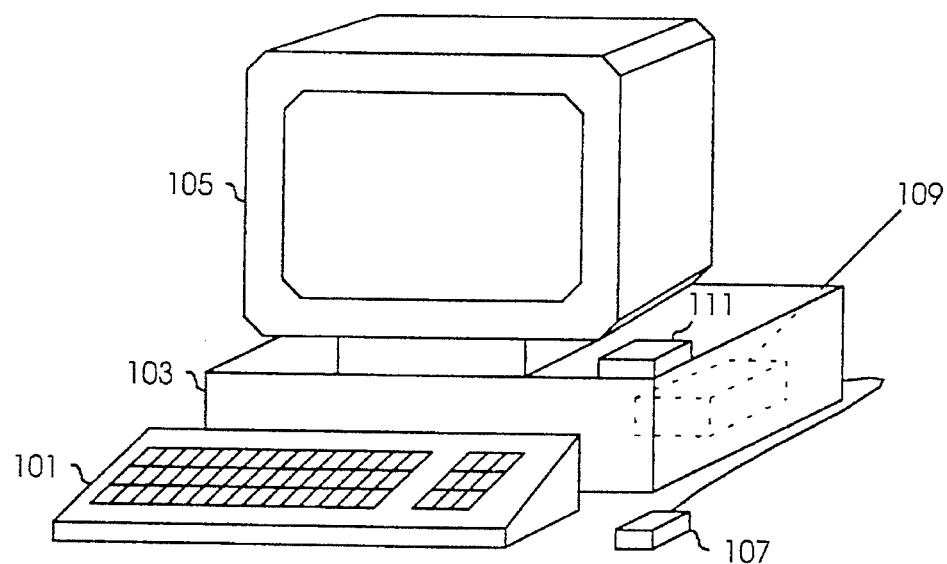
FIG. 1 is a perspective view of a secure computer system according to the present invention.

In the following detailed description of the preferred embodiments, reference is made to the accompanying drawings which form a part hereof, and in which is shown by way of illustration specific embodiments in which the invention may be practiced. It is to be understood that other embodiments may be utilized and structural changes may be made without departing from the scope of the present invention.

The following is a list of reference numerals and descriptions corresponding to the numerals employed in the accompanying set of drawing figures.

NUMERALS AND DESCRIPTIONS 101 keyboard
103 computer chassis
105 screen display
107 pointing device
109 card reader interface
111 integrated card reader
113 integrated circuit (IC) card
115 microprocessor
117 second data bus
119 power control circuit
121 peripheral devices
123 central processing unit (CPU)
125 system data bus
126 boot rom
127 random access memory (RAM)
129 program logic device (PLD)
131 third data bus
133 fourth data bus
135 power circuit
137 clear
139 +5 volt lithium battery
141 address or data select
143 strobe
145 chip select
147 clear to send (CTS)
149 data terminal ready (DTR)
151 10 MHz clock
153 serial data out
155 serial data in
157 3.5 MHz clock
159 card reset
161 card serial data control
163 card interrupt control
164 hard disk drive
165 physical destruct
166 physical destruct mechanism
167 card serial data in
168 physical destruct action
169 card serial data out
171 card power control switch
173 card power control line
175 +5 volt relay
177 card serial data contact
179 card clock contact
181 card reset contact
183 card logic voltage supply contact
185 card ground contact
187 card programming contact
189 card detect contact
191 card detect power contact
193 reserved for future use
195 reserved for future use
197 reserved for future use

DETAILED DESCRIPTION

FIG. 1 shows the components of a computer system to be secured with a card reader interface. The computer system includes a keyboard 101 by which a user may input data into the system, a computer chassis 103 which holds electrical components and peripherals, a screen display 105 by which information is displayed to the user, and a pointing device 107, the system components logically connected to each other via the internal system bus of the computer. A card reader 111 is connected to the secure computer system via card reader interface 109. The preferred card reader 111 is an Amphenol® "Chipcard" acceptor device, part number C 702 10 M 008 103 4, which is compatible with International Standards Organization (ISO) specification 7816, although one skilled in the art would readily recognize that other card reader devices which conform to ISO 7816 may be substituted.

Figure 2:
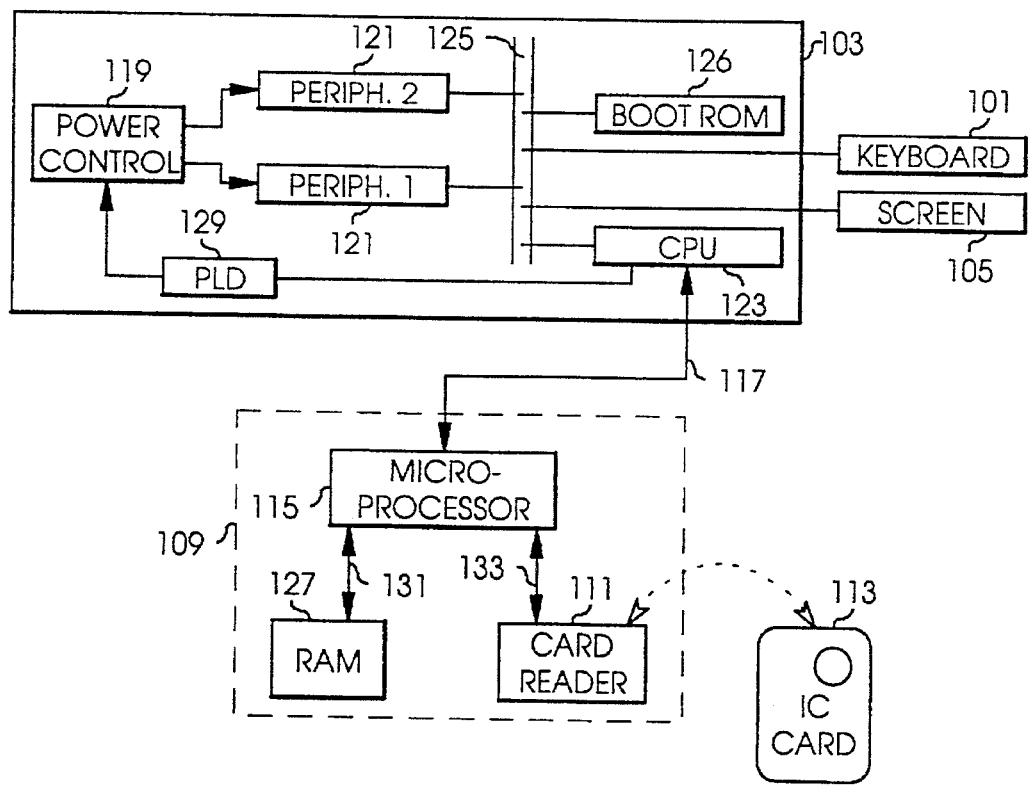
FIG. 2 is a block diagram showing the high-level architecture of a secure computer system according to the present invention.

In order for the computer system to be secured, a card reader interface is integrated into the computer system in a manner similar to that as revealed in FIG. 2. A card reader interface board 109 contains a microprocessor 115 connected to the CPU of the computer via a second data bus 117, connected to RAM 127 via a third data bus 131, and connected to the card reader 111 via a fourth data bus 133. The interface board 109 is typically implemented with printed circuit board technology, although other equivalent technologies may be substituted without loss of generality. Peripherals 121 within computer 103 are controlled by the CPU 123 and PLD 129 with a power control circuit 119, which turns power off and on to peripherals 121. A system boot ROM 126 logically connected to the CPU 123 via system data bus 125 is programmed to instruct the CPU 123 to start executing a non-volatile program contained in PLD 129 upon power-up, clear, or warm-boot reset of the computer.

An IC card 113 is used in conjunction with card reader 111. The preferred IC card 113 is a MICRO CARD® model SCOT 100 or model TB100 IC card, which is compatible with ISO standards 7810, 7813, and 7816. By conforming to these standards, the IC card 113 provides support for Data Encryption Standard (DES) data encryption and decryption functions. One skilled in the art would readily recognize that other IC cards which conform to these standards and provide data encryption and decryption functions may be substituted. The ability to encrypt and decrypt data is important, since the present invention is designed to never allow unencrypted security data to exist on the CPU where it could be subject to compromise by a malicious user.

Figure 3:
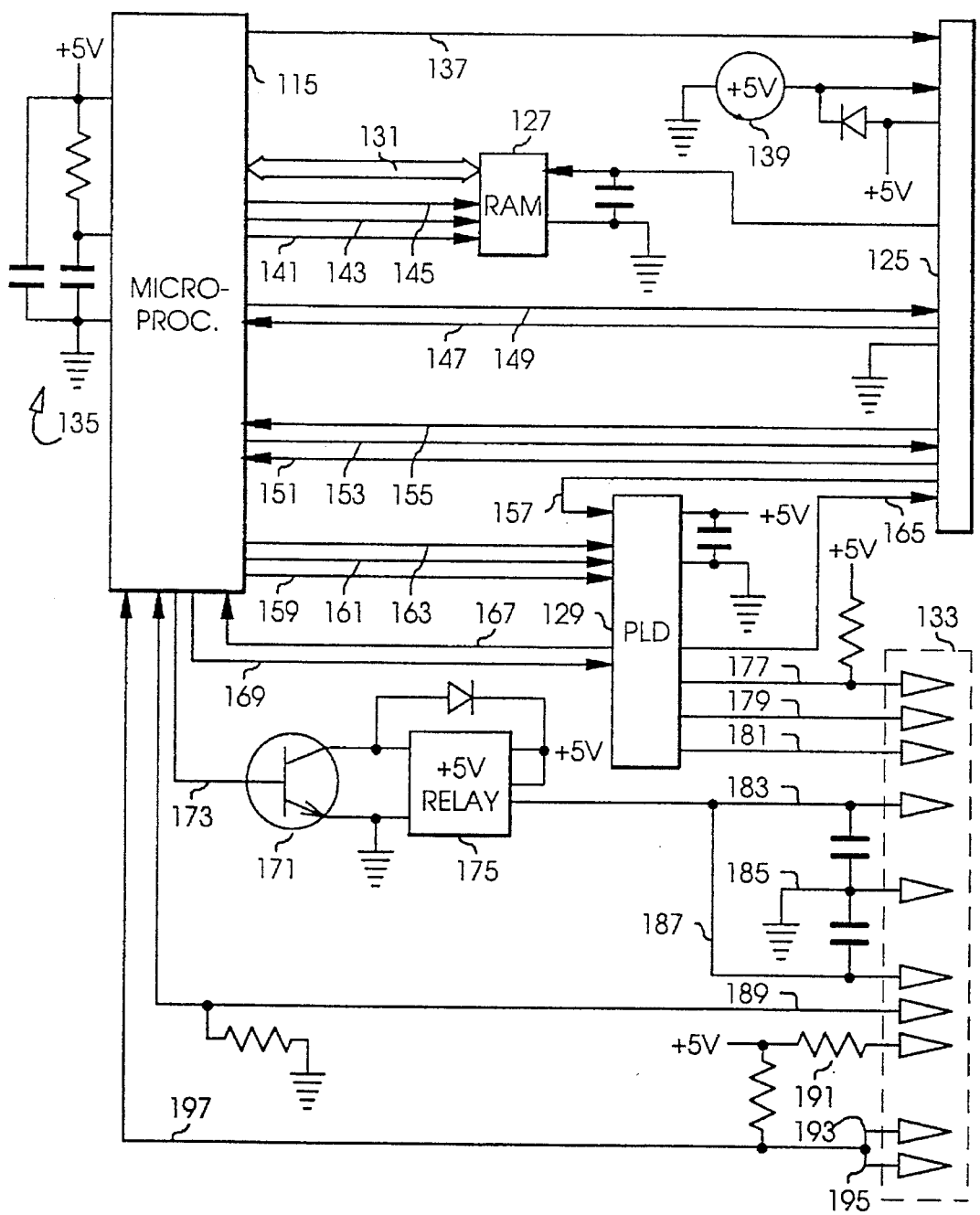
FIG. 3 is a schematic diagram showing the microprocessor-controlled card reader interface for a secure computer system according to the present invention.

The schematic for card reader interface 109 is described in greater detail in FIG. 3. Microprocessor 115 is powered by circuit 135, and controls system functions via connections to the system data bus 125. System resets are initiated by clear line 137. Validation and authorization information is transferred between the microprocessor 115 and RAM 127 via the third data bus 131 in conjunction with address or data select line 141, strobe line 143, and chip select line 145. Backup power is provided for RAM 127 by a +5 volt lithium battery 139.

The microprocessor 115 communicates with system data bus 125 as a serial communications device using CTS line 147, DTR line 149, 10 MHz clock line 151, serial data out line 153, and serial data in line 155. A separate 3.5 MHz clock line 157 is used to provide a clock signal to PLD 129, which is used by the microprocessor 115 for card reset control via line 159, card serial data control via line 161, and card interrupt control via line 163. The PLD 129 in turn connects to the card via card serial data contact 177, card clock contact 179, and card reset contact 181.

The microprocessor 115 also has the ability to control the physical destruction of data within the computer system via line 165. The line connects to a mechanism containing a chemical solution which is sprayed onto a hard disk contained in the secure computer system in response to unauthorized attempts by a user to violate the physical or logical integrity of the computer system. The preferred chemical solution is that of ferric chloride, however, one of ordinary skill in the art would recognize that other equivalent destruction chemicals and mechanisms may be substituted without loss of generality.

The microprocessor 115 uses power control line 173 with switch 171 and +5 volt relay 175 to provide power to the card via card logic voltage supply contact 183 and card programming contact 187. The card is grounded via card ground contact 185, and detected by power being applied through card detect power contact 191 to microprocessor 115 by card detect contact 189. Card contacts 193 and 195 and line 197 are reserved for future use.

Figure 4:
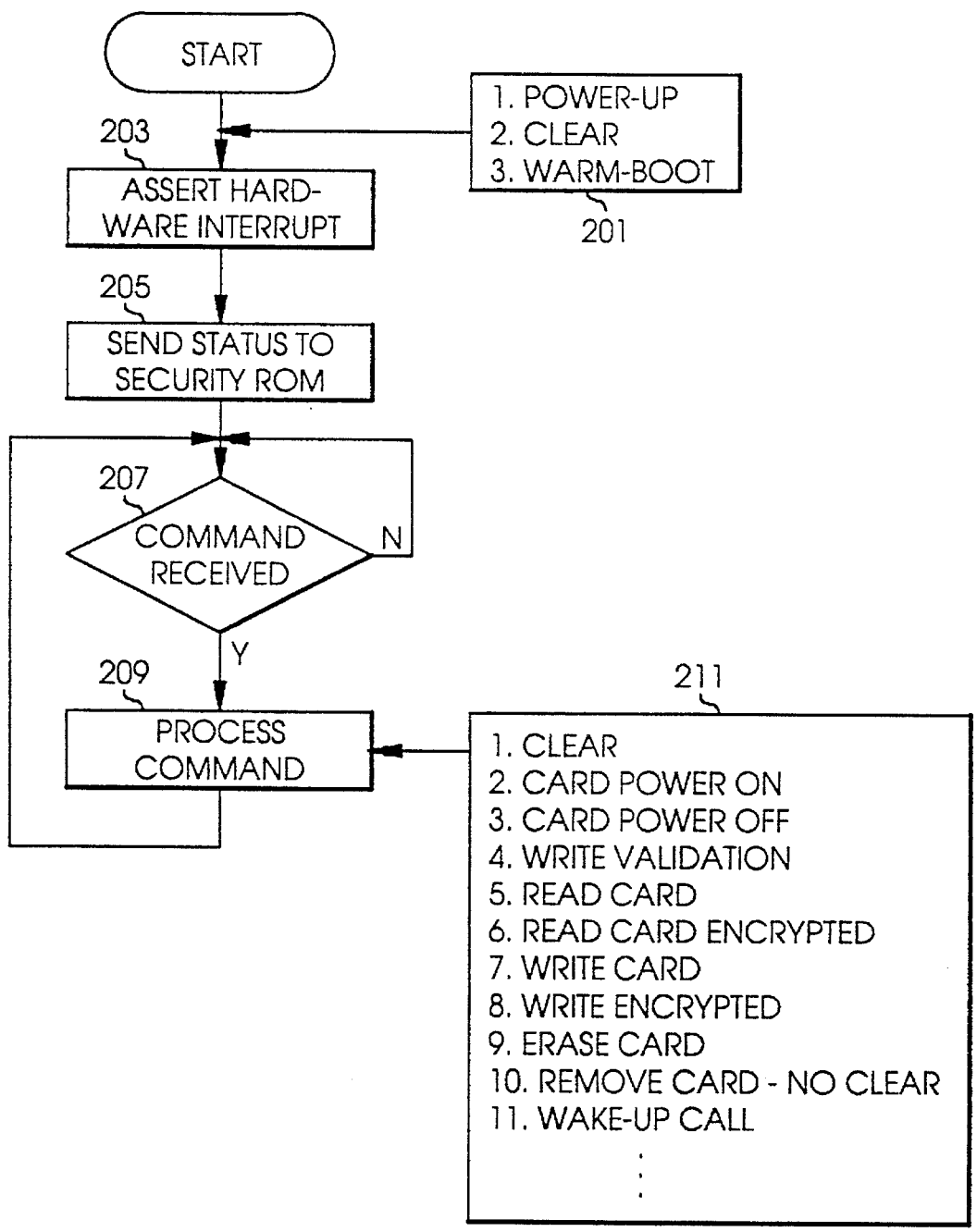
FIG. 4 is a flow diagram showing the steps taken to read and write information from and to a card according to the present invention.
Figure 5:
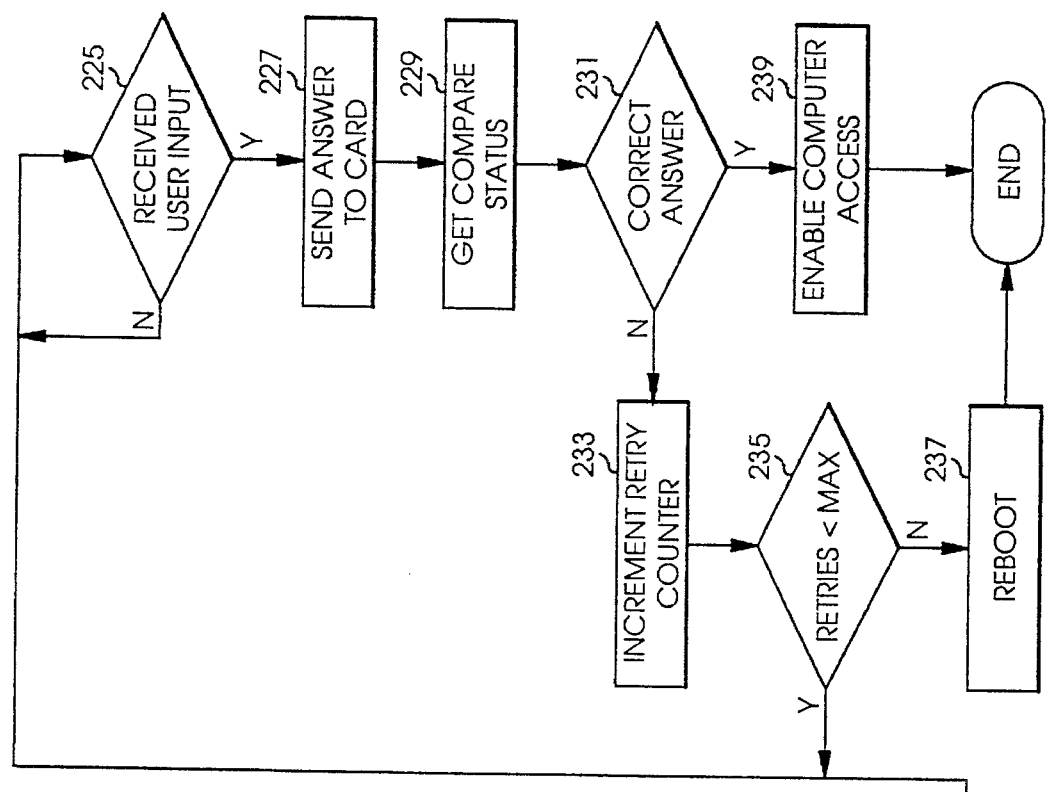
FIG. 5 is a flow diagram showing the steps taken to verify a user according to the present invention.
Figure 5:
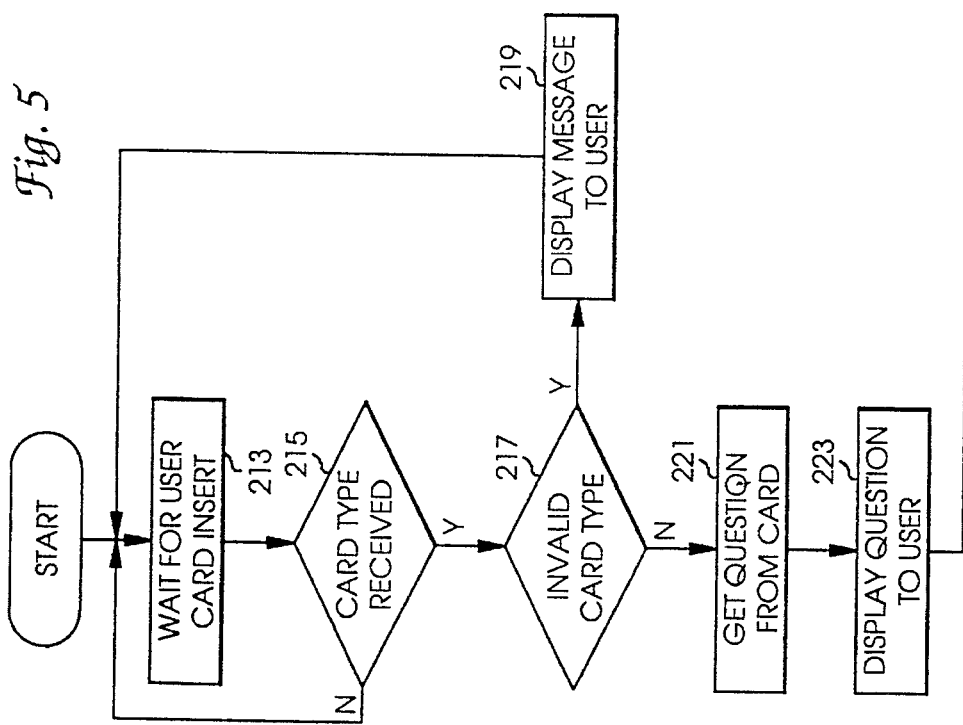

As illustrated by the method of FIG. 4, the microprocessor 115 works in conjunction with CPU 123 running under program control of the PLD 129 in order to perform functions involving the card 113. The microprocessor 115 runs in an infinite loop interpreting and performing commands sent to it by the CPU 123. At 201, the microprocessor 115 is started by either a computer system power-up, a system clear, or a system warm-boot. At 203, a hardware interrupt is asserted on the system bus, the current status is sent to the CPU at 205, and at 207 the microprocessor 115 waits for a command to be received from the CPU 113. Upon receipt of a valid command 211, the command is processed at 209 and control returns to 207. The list of valid commands interpreted by the microprocessor 115 includes but is not limited to:

1. Clear
2. Card Power On
3. Card Power Off
4. Write Validation
5. Read Card
6. Read Card Encrypted
7. Write Card
8. Write Card Encrypted
9. Erase Card
10. Remove Card—No Clear
11. Wake-Up Call FIG. 5 shows the steps taken by the CPU 123 and microprocessor 115 in order to verify the authenticity of a user of the secure computer system. At 213, the microprocessor waits for a valid user card to be inserted into the card reader, and at 215 the CPU waits for the microprocessor to send a card type status code. If no card type is received, control returns to 213. If at 215 a card type is received, it is checked for validity at 217. If the card type is invalid, a status message is displayed to the user at 219 and control returns to 213. If at 217 the card type is valid, a question is read from the card at 221, displayed to the user at 223, and the CPU waits for a user response at 225. Once the CPU receives a response from the user, the response is sent to the microprocessor at 227. The microprocessor compares the user response to the correct response stored on the card, and returns a compare status to the CPU at 229. This step is performed solely by the microprocessor so that unencrypted security data is never available to the CPU. If at 231 the compare status indicates a non-matching response, a retry counter is incremented at 233 and checked at 235 to see if it is less than a predetermined maximum allowed value. If the value of the retry counter is less than the maximum allowed value, control returns to 225, otherwise at 237 the secure computer electrically erases RAM 127 and initiates the physical destruction of the hard disk 164 via line 165 if authorized by the security administrator, then reboots the computer. If at 231 the compare status indicates a matching response, at 239 the CPU uses power control circuit 119 to turn on power to the secure computer system peripherals that the user has been authorized to use. Such peripherals might include, but are not limited to, a floppy disk drive, a hard disk drive, serial port, parallel port, and internal modem depending on the configuration of the secure computer system.

In an alternative embodiment, access to specific directories on a hard disk is enabled by IC card 113. A DES encryption chip attached to system data bus 125 is used with a modified version of the secure computer system basic input/output system (BIOS) to encrypt the information and files stored in a specific subdirectory with a key value. The key value for each subdirectory the user has access to is stored on the IC card 113. Upon successfully completing the verification procedure described above and shown in FIG. 5, the key values for the subdirectories are read from the IC card 113 and used by the BIOS and DES chip to encrypt and decrypt information and files as needed by the user. If directory creation is allowed for the user, a personal user key is used to encrypt and decrypt the new directory and all information and files contained within it.

Figure 6A:
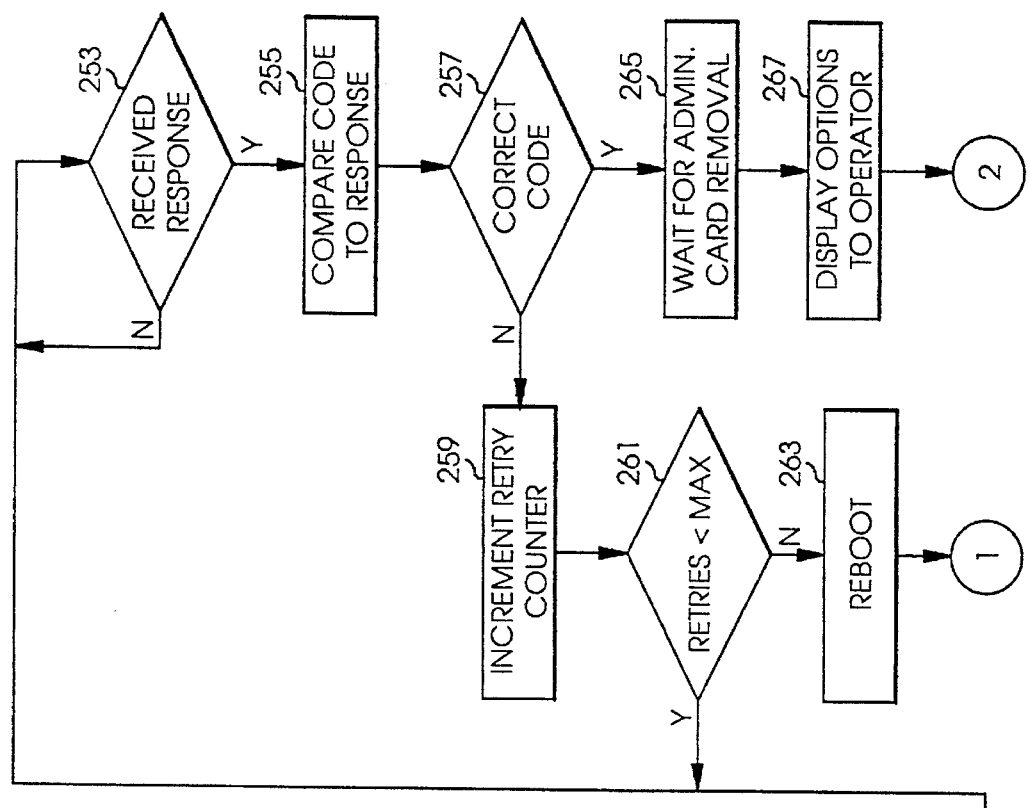
FIGS. 6a and 6b is a flow diagram showing the steps taken to authorize a user according to the present invention.
Figure 6A:
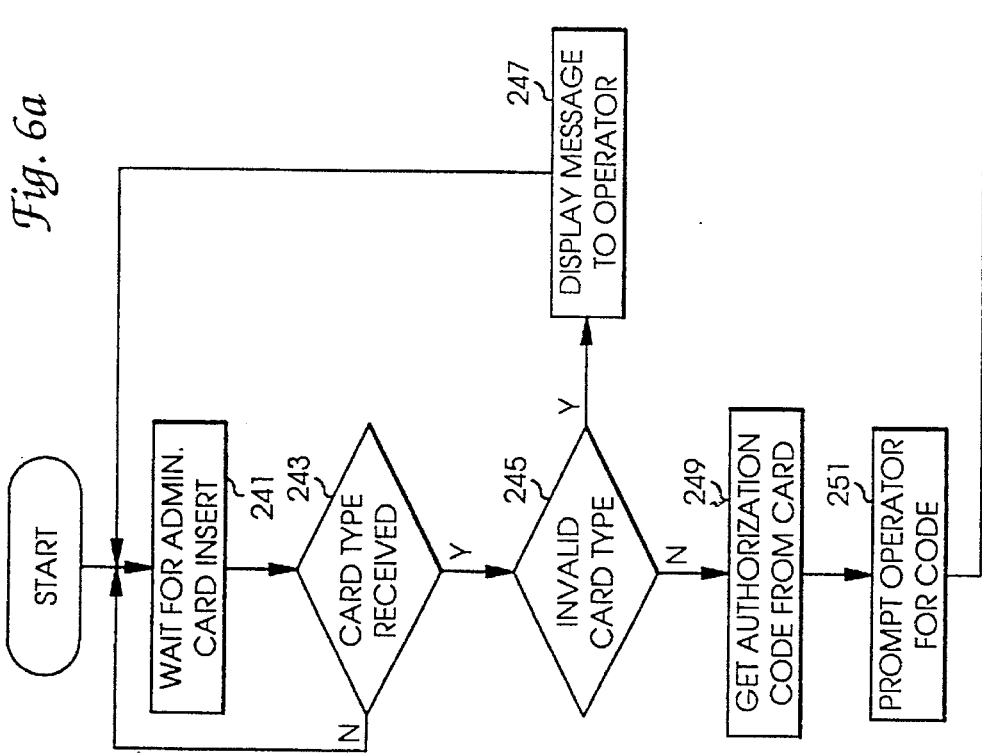
Figure 6B:
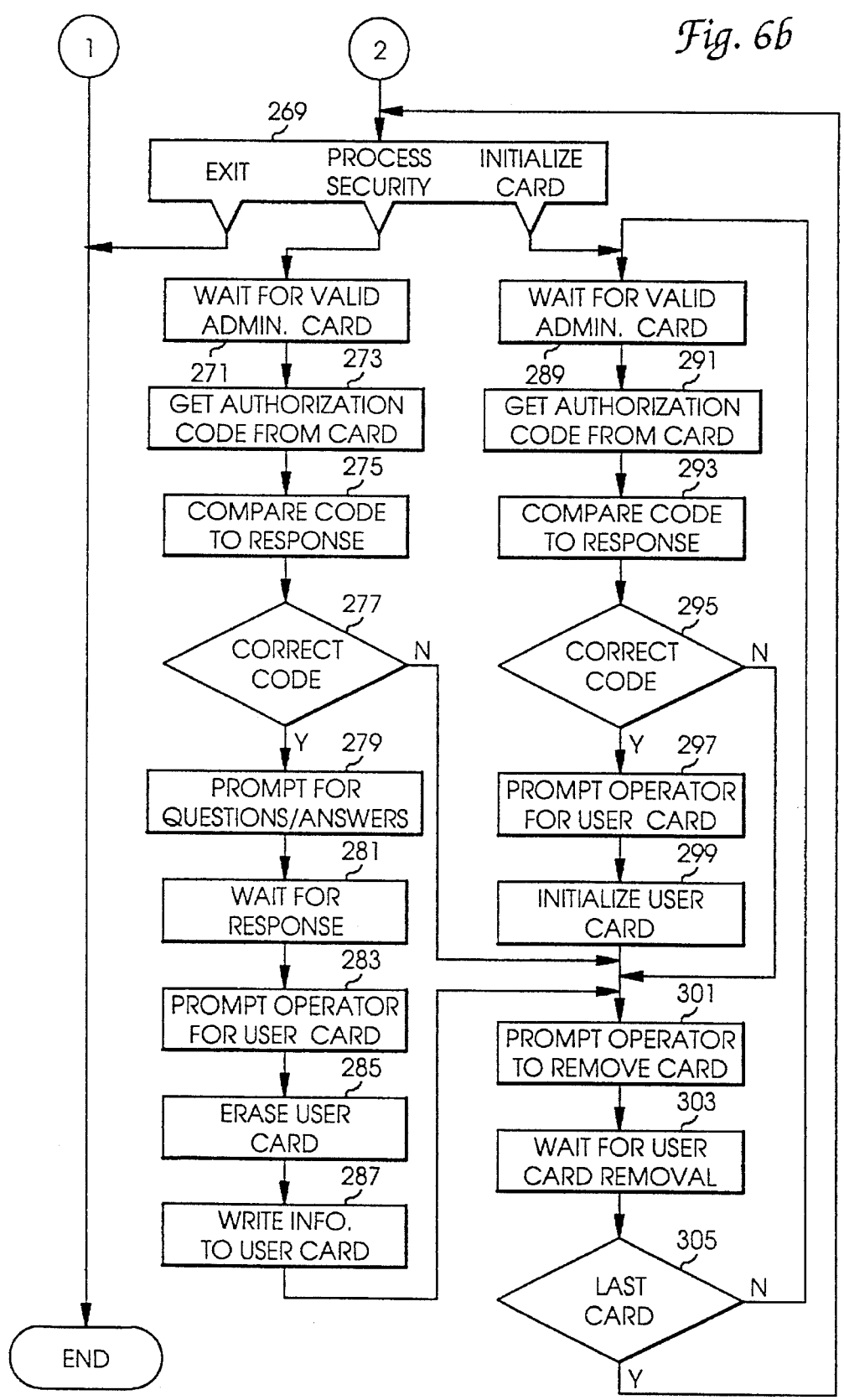

The procedure used by a security administrator to authorize a user is revealed in FIG. 6. At 241, the microprocessor waits for a valid administrator card to be inserted into the card reader, and at 243 the CPU waits for the microprocessor to send a card type status code. If no card type is received, control returns to 241. If at 243 a card type is received, it is checked for validity at 245. If the card type is invalid, a status message is displayed to the operator at 247 and control returns to 241. If at 245 the card type is valid, an authorization code is read from the card at 249, the operator is prompted for the code at 251, and the CPU waits for an operator response at 253. Once the CPU receives a response from the operator, the response is sent to the microprocessor and compared with the authorization code at 255. If at 257 the compare status indicates a non-matching response, a retry counter is incremented at 259 and checked at 261 to see if it is less than a predetermined maximum allowed value. If the value of the retry counter is less than the maximum allowed value, control returns to 253, otherwise at 263 the secure computer electrically erases RAM 127 and initiates the physical destruction of the hard disk 164 via line 165 if authorized by the security administrator, then reboots the computer. If at 257 the compare status indicates a matching response, at 265 the CPU waits for the administration card to be removed, displays a list of menu options to the operator at 267, and waits for an operator selection at 269.

The list of menu options includes but is not limited to exit, initialize card, and process security. If at 269 the operator selects exit, the program terminates and no further action is taken. If at 269 the operator selects initialize card, at 289 the CPU waits for a valid administrator card to be inserted into the card reader, gets an authorization code from the card at 291, and compares the code to an operator response at 293. If at 295 the code matches the response, the operator is prompted to insert a valid user card at 297, and the user card is initialized at 299, otherwise control continues at 301. At 301 the operator is prompted to remove the card and the CPU then waits at 303 for the card to be removed. If at 305 there are no more cards to be initialized, control returns to 269, otherwise control returns to 289.

If at 269 the operator selects process security, at 271 the CPU waits for a valid administrator card to be inserted into the card reader, gets an authorization code from the card at 273, and compares the code to an operator response at 275. If at 277 the code does not match the response, control continues at 301. Otherwise, the operator is prompted to enter a list of questions and answers at 279, the CPU waits for an operator response at 281, then prompts the operator for the user card at 283. At 285 the user card is erased, the questions and answers and other information is written to the card at 287, and control continues at 301.

Figure 7:
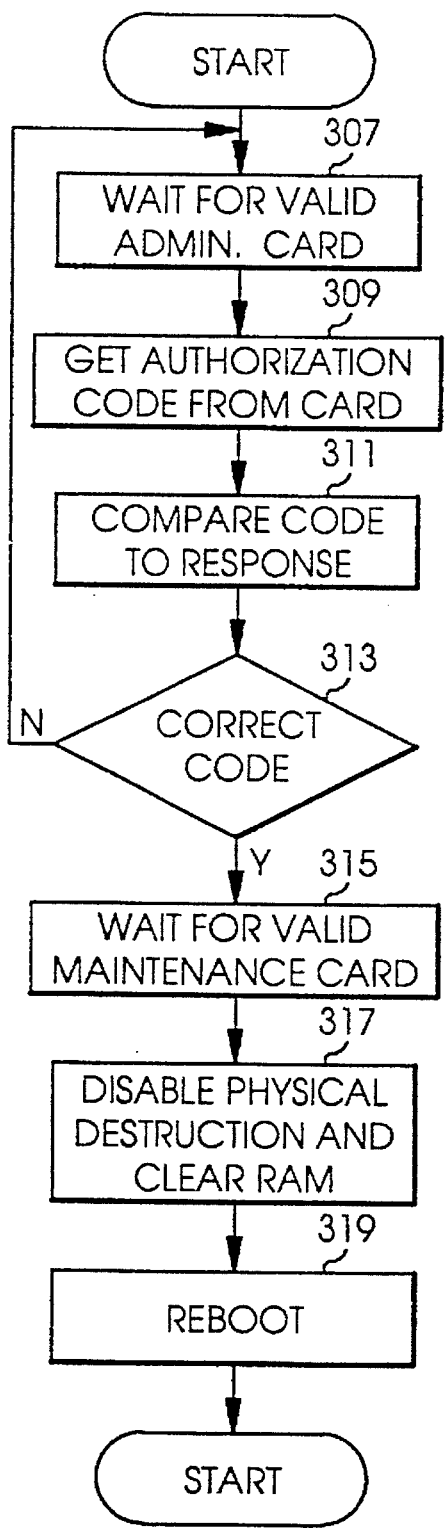
FIG. 7 is a flow diagram showing the steps taken to deactivate the physical and logical destruction of data according to the present invention.

The secure computer system physically and logically destroys data within the system in response to unauthorized attempts by a user to violate the physical or logical integrity of the computer system. In order to deactivate this system in order to perform system maintenance or change the system configuration, a maintenance card is used with the procedure described in FIG. 7. At 307 the CPU waits for a valid administrator card to be inserted into the card reader, gets an authorization code from the card at 309, and compares the code to an operator response at 311. If at 313 the code does not match the response, control returns to 307. Otherwise, upon detecting a valid maintenance card at 315, at 317 the CPU disables the physical destruction of data and clears RAM 127, then reboots the system at 319. The system may now be safety shut down for maintenance. Physical and logical destruction of data are automatically reenabled upon the next time the system is restarted after maintenance or configuration is performed.

Figure 8:
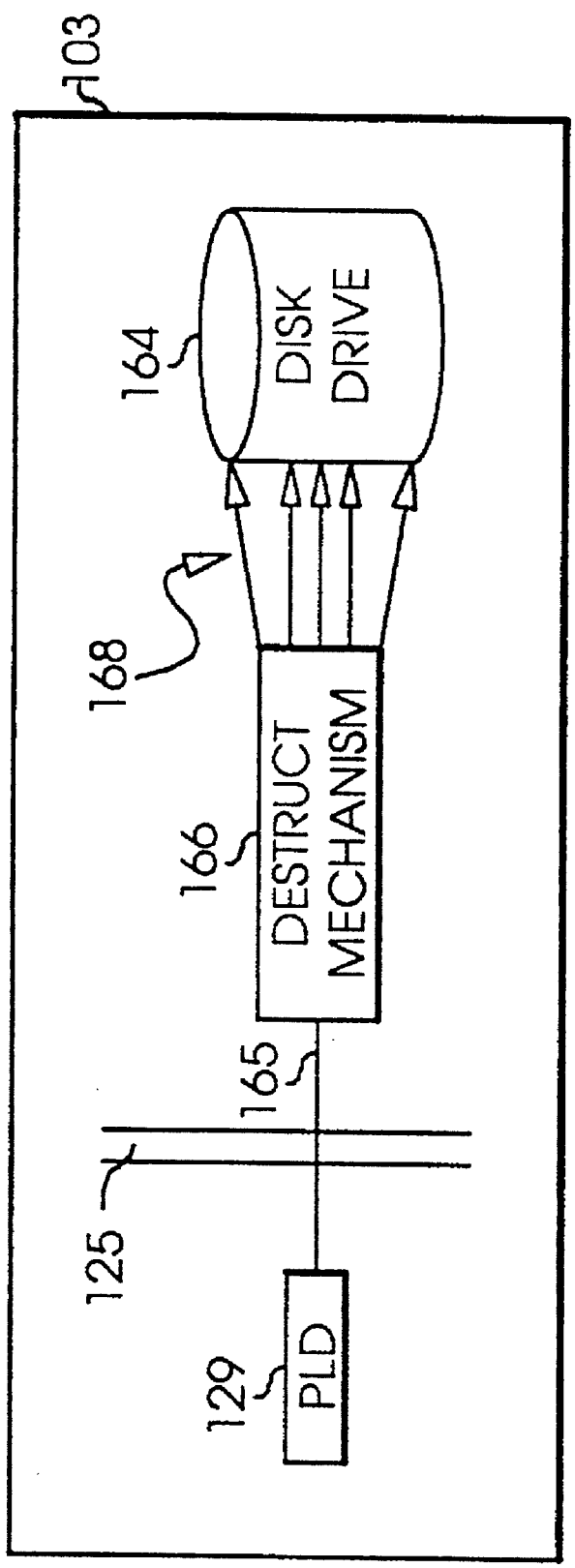
FIG. 8 is a block diagram showing the high-level physical destruct mechanism of a secure computer system according to the present invention.

FIG. 8 illustrates the physical destruct mechanism of the secure computer system. PLD 129 sends a signal via system data bus 125 and line 165 to physical destruct mechanism 166. The physical destruct mechanism 166 is connected to hard disk drive 164 and physically destroys data 168 by spraying a chemical such as ferric chloride into the hard disk or performing an equivalent physical, chemical, or electrical action to insure the irrecoverable loss of data on the hard disk.

It is to be understood, however, that even though numerous characteristics and advantages of the invention have been set forth in the foregoing description, together with details of the structure and function of the invention, the disclosure is illustrative only, and changes may be made in detail, especially in matters of shape, size, and arrangement of parts within the principles of the invention, to the full extent indicated by the broad general meaning of the terms in which the appended claims are expressed.

What is claimed is:

1. A method for controlling access to a computer having a central processing unit (CPU), the CPU executing a boot program to initialize the computer, the method comprising the steps of:

following power-up clear or reset of the CPU,
interrupting execution of the boot program; and
loading a verification program from a nonvolatile dedicated memory;
upon attempted access by a user,
executing the verification program to determine whether the user is authorized to access the computer:
if the user is authorized, completing execution of the boot program and providing access to the computer; and
if the user is not authorized, denying the user access to the computer.

2. The method according to claim 1 wherein the step of executing further comprises the steps of:

reading a card programmed with identification information from a card reader; and comparing responses from the user to the identification information from the card to determine if the user is authorized to access the machine.

3. A system for controlling access to a computer, the computer comprising a system bus and a central processing unit (CPU), the system comprising:

an input device for providing authorization information to the computer which is cross checked with authorization information provided by a user; and an access control device, connected to the system bus, for interfacing the input device and the CPU and for controlling the computer upon initialization, the access control device comprising:

a storage device for storing a verification program, the verification program containing CPU code for verifying that the user is authorized to access the computer; and a program code stored in a nonvolatile system boot memory device, for causing the CPU to execute the verification program and acquire control of the system bus and CPU substantially immediately after commencement of initialization of the computer and prior to completion of initialization;

wherein the verification program and the program code are fixed and unmodifiable by the CPU.

4. The system according to claim 2, wherein the system further comprises a data destruction means for destroying sensitive data stored in the computer if unauthorized access is attempted.

5. The system according to claim 4, wherein the data destruction means further comprises logical destruction means and physical destruction means.

6. A method of securing data stored in a computer, the computer having a memory device, system bus, and central processing unit (CPU), the method comprising the steps of:

providing a card reader and card reader interface;

providing a card programmed with identification information;

providing an encryption key stored on the card;

providing an encryption engine for encrypting data transferred from the CPU to the memory device and decrypting data transferred from the memory device to the CPU using the same encryption key for decrypting data as for encrypting data;

providing a verification program, the verification program querying the user for identification information;

providing a nonvolatile system boot program for booting the system;

executing the verification program after execution of the non-volatile program, the verification program querying the user for identification information; and if the user is authorized, encrypting the data stored in the memory device and decrypting information retrieved from the memory device using the encryption key stored on the card.

7. The method according to claim 6, wherein the step of providing an encryption key includes constructing a different encryption key for each memory device in the computer.

8. The method according to claim 6, wherein the step of providing an encryption key includes constructing a different encryption key for each logical device in the computer.

9. A secure computer providing for the controlled access of internal devices via a card reader and the security of data stored in the computer, the computer comprising:

a user input device;

a card reader;

a screen display;

a central processing unit (CPU):

a device containing non-volatile CPU program code;

a CPU system boot ROM, said CPU system boot ROM including code for instructing the CPU to start executing the CPU program code in the device so that the CPU program code in the device takes over control of the CPU, so that upon a power-up clear or reset of the computer the CPU program code in the device obtains control of the CPU, and said CPU responsive to said CPU program code, to perform an authorization procedure comprising the step of reading a card placed in the card reader by a user;

a plurality of peripheral devices;

a system data bus;

a microprocessor for writing and reading information to and from a card placed in the card reader, the microprocessor and the CPU connected through a dedicated data bus;

a power control circuit logically connected between the CPU and each of the plurality of peripheral devices for selectively controlling power to each of the plurality of peripheral devices; and an encryption engine for encrypting data stored in the plurality of peripheral devices and for decrypting data read from the plurality of peripheral devices.

* * * * *

UNITED STATES PATENT AND TRADEMARK OFFICE
CERTIFICATE OF CORRECTION

PATENT NO. : 5,515,440
DATED : May 7, 1996
INVENTOR(S) : David M. Mooney et al.

It is certified that error appears in the above-indentified patent and that said Letters Patent is hereby corrected as shown below:

Column 8, Line 26, please delete "claim 2" and insert --claim 3-- therefor.

Signed and Sealed this

Fifteenth Day of October, 1996

Attest:

BRUCE LEHMAN

*Attesting Officer*   Commissioner of Patents and Trademarks